(12) United States Patent
Kim et al.

(10) Patent No.: US 11,071,946 B2
(45) Date of Patent: Jul. 27, 2021

(54) NANO-CATALYST FILTER AND PRODUCTION METHOD FOR SAME

(71) Applicant: Korea University Research and Business Foundation, Seoul (KR)

(72) Inventors: Young Keun Kim, Seoul (KR); Su-Hyo Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 129 days.

(21) Appl. No.: 16/440,145

(22) Filed: Jun. 13, 2019

(65) Prior Publication Data

US 2019/0358586 A1 Nov. 28, 2019

Related U.S. Application Data

(63) Continuation-in-part of application No. 14/779,837, filed as application No. PCT/KR2014/002729 on Mar. 31, 2014, now abandoned.

(30) Foreign Application Priority Data

Mar. 29, 2013 (KR) ........................ 10-2013-0034022

(51) Int. Cl.
| | |
|---|---|
| *B01D 53/86* | (2006.01) |
| *B01D 39/20* | (2006.01) |
| *B01J 23/02* | (2006.01) |
| *B01J 23/10* | (2006.01) |
| *B01J 23/22* | (2006.01) |
| *B01J 35/00* | (2006.01) |
| *B01J 35/02* | (2006.01) |

(Continued)

(52) U.S. Cl.
CPC ..... *B01D 53/8628* (2013.01); *B01D 39/2068* (2013.01); *B01J 23/02* (2013.01); *B01J 23/10* (2013.01); *B01J 23/22* (2013.01); *B01J 35/002* (2013.01); *B01J 35/023* (2013.01); *B01J 35/026* (2013.01); *B01J 35/04* (2013.01); *B01J 37/0215* (2013.01); *B01J 37/348* (2013.01); *C25D 3/00* (2013.01); *C25D 5/02* (2013.01); *B01D 2255/2045* (2013.01); *B01D 2255/2065* (2013.01); *B01D 2255/2073* (2013.01); *B01D 2255/20723* (2013.01); *B01D 2255/50* (2013.01); *B01D 2255/9202* (2013.01); *B01D 2255/9205* (2013.01); *B01D 2257/404* (2013.01); *B01D 2257/708* (2013.01);

(Continued)

(58) Field of Classification Search
None
See application file for complete search history.

(56) References Cited

U.S. PATENT DOCUMENTS

| | | | |
|---|---|---|---|
| 3,480,523 | A | 11/1969 | Nelseon |
| 4,882,232 | A | 11/1989 | Bugnet et al. |

(Continued)

FOREIGN PATENT DOCUMENTS

| | | |
|---|---|---|
| JP | S52111485 A | 9/1977 |
| JP | 2006-513856 A | 4/2006 |

(Continued)

*Primary Examiner* — Louis J Rufo
(74) *Attorney, Agent, or Firm* — Fox Rothschild LLP

(57) ABSTRACT

Provided is a method of manufacturing a nano-catalyst filter, which includes depositing through electrodeposition a catalyst precursor inside a porous filter to which an electrode layer is attached. Using this method, a nano-catalyst can be uniformly deposited inside a porous ceramic filter, and high catalyst efficiency can be obtained only using a small amount of the nano-catalyst.

14 Claims, 15 Drawing Sheets

(51) Int. Cl.
*B01J 35/04* (2006.01)
*B01J 37/02* (2006.01)
*B01J 37/34* (2006.01)
*C25D 3/00* (2006.01)
*C25D 5/02* (2006.01)
*C25D 5/10* (2006.01)
*C25D 5/50* (2006.01)
*C25D 5/54* (2006.01)

(52) U.S. Cl.
CPC .............. *C25D 5/10* (2013.01); *C25D 5/50* (2013.01); *C25D 5/54* (2013.01)

(56) References Cited

U.S. PATENT DOCUMENTS

| | | |
|---|---|---|
| 2002/0050479 A1 | 5/2002 | Scott |
| 2006/0188774 A1* | 8/2006 | Niu ................. H01M 4/921 429/409 |
| 2009/0008258 A1 | 1/2009 | Rei et al. |
| 2009/0130425 A1 | 5/2009 | Whitaker |
| 2011/0117338 A1 | 5/2011 | Poquette et al. |
| 2011/0171137 A1 | 7/2011 | Patolsky et al. |
| 2012/0175534 A1 | 7/2012 | Jung et al. |
| 2018/0033516 A1* | 2/2018 | Lee ................. H01B 13/0016 |
| 2019/0010622 A1* | 1/2019 | Yang ................. C25B 11/091 |

FOREIGN PATENT DOCUMENTS

| | | |
|---|---|---|
| JP | 2008177023 A | 7/2008 |
| KR | 20040095581 A | 11/2004 |
| KR | 2006-0039276 A | 5/2006 |
| KR | 10-0692191 B1 | 3/2007 |
| KR | 2007-0075044 A | 7/2007 |
| KR | 2009-0065568 A | 6/2009 |
| KR | 2010-0127832 A | 12/2010 |
| WO | 2013008019 A1 | 1/2013 |

* cited by examiner

POROUS FILTER ATTACHMENT OF ELECTRODE LAYER

LOW VACUUM

CATALYTIC MATERIAL-DEPOSITED FILTER DEPOSITION OF CATALYTIC MATERIAL

FIG. 3(a)
FIG. 3(b)
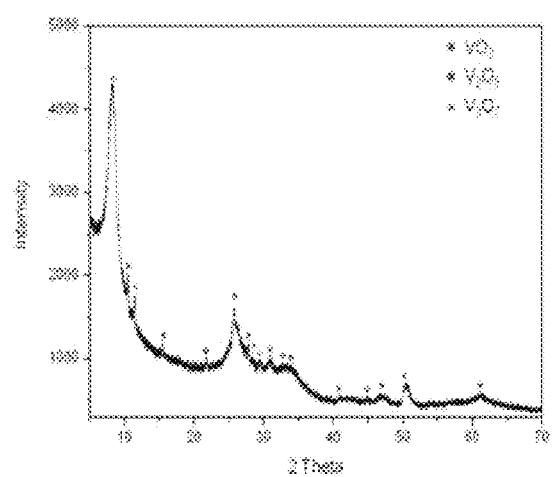
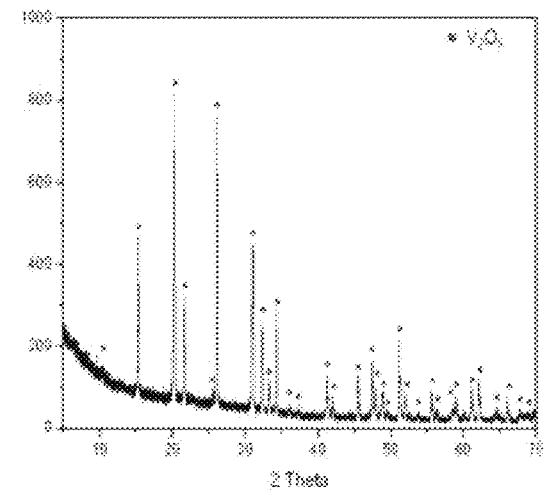
FIG. 4
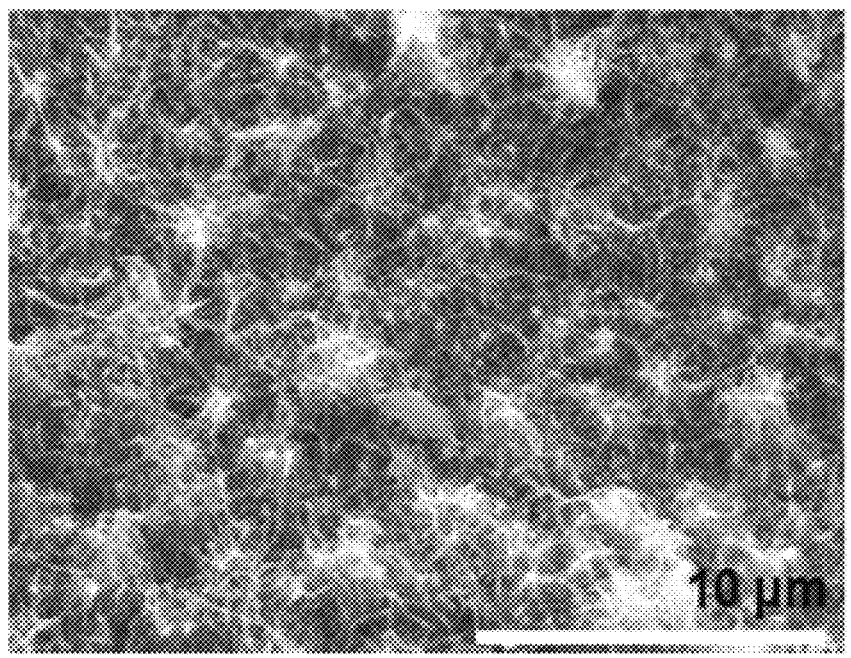

FIG. 5(a)
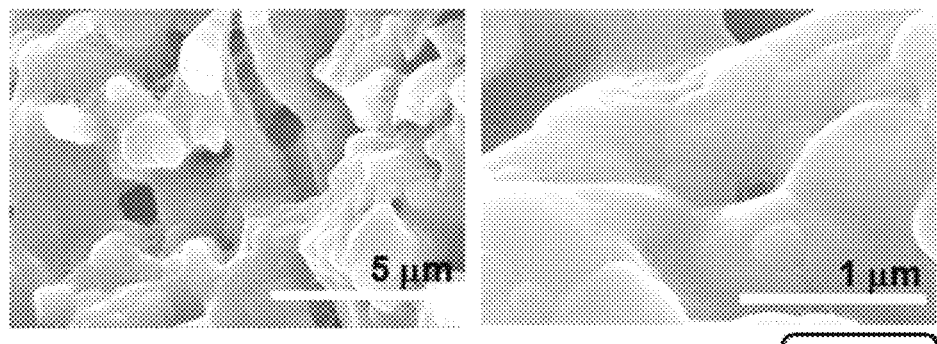
FIG. 5(b)
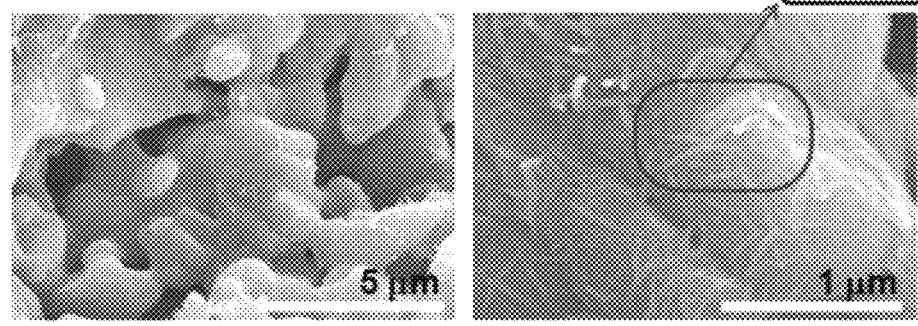
FIG. 6(a)　　　　FIG. 6(b)
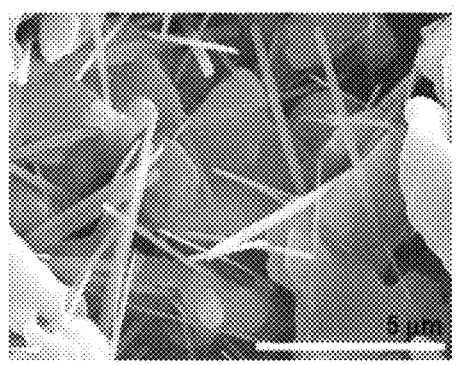 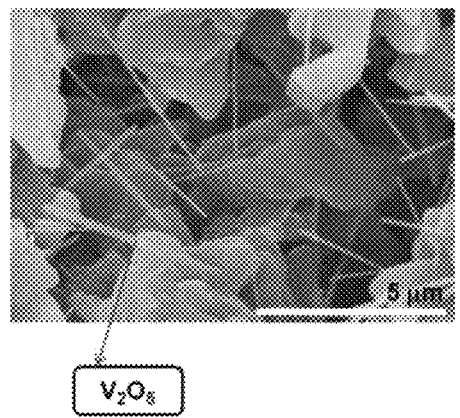

[FIG. 8]
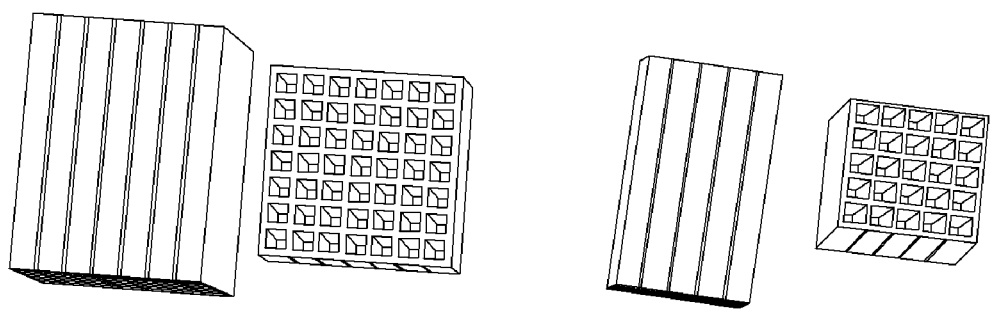
[FIG. 9]
(a)  (b)
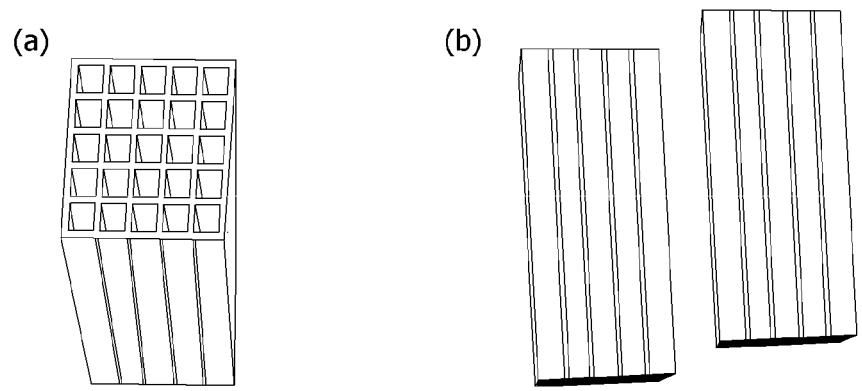

FIG. 16(a)
FIG. 16(b)
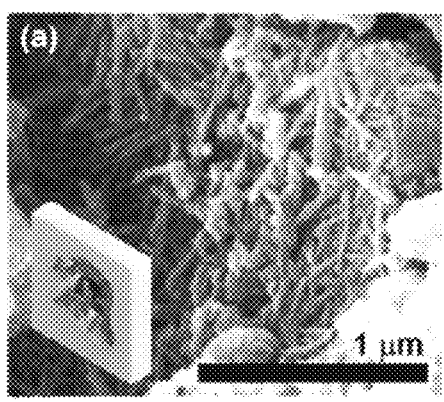
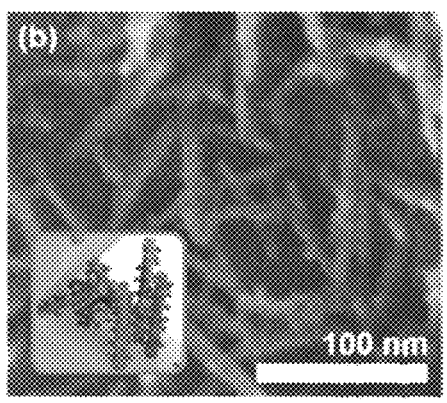
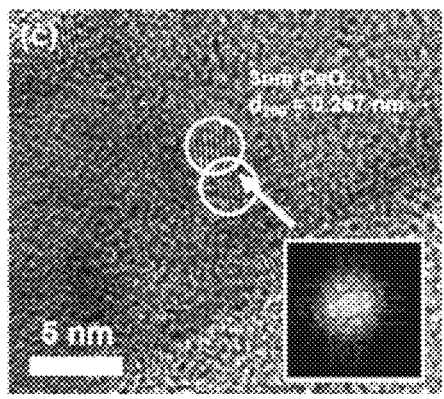
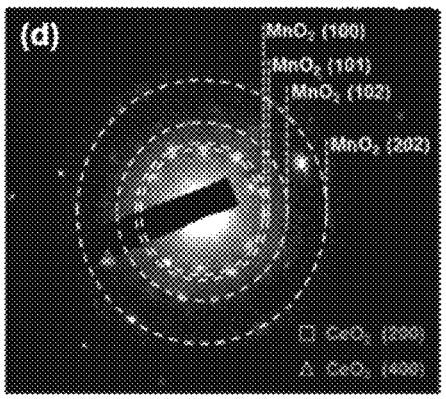
FIG. 16(c)
FIG. 16(d)

NANO-CATALYST FILTER AND PRODUCTION METHOD FOR SAME

TECHNICAL FIELD

The present invention relates to a method of manufacturing a nano-catalyst filter and a nano-catalyst filter manufactured thereby.

BACKGROUND ART

As the technology related to industrial structures has advanced, the amount of high-temperature exhaust emissions generated from automotive engines, ships, thermoelectric power plants, and incinerators in various industries is greatly increasing. These exhaust emissions contain a significant amount of harmful gases such as nitrogen oxide (NOx), sulfur oxide (SOx), and volatile organic compounds (VOC), in addition to fine dust that is harmful to the human body, and thereby serious issues related to environmental pollution are being caused.

Various types of exhaust gas denitrification technology has been widely studied for a period of over 30 years throughout the world. Among these technologies, selective catalytic reduction (SCR) has been practically utilized as it is the most effective technology, and a method of simultaneously treating dust and harmful gases by providing a harmful gas removal property to a ceramic filter for collecting dust has been used to conserve operation cost and space.

As catalysts for removing NOx, various catalysts including vanadium oxide, zeolite, iron oxide, activated carbon, platinum, palladium, etc. are used. As a method of coating a catalyst on a ceramic filter, dip coating or wash coating is generally used.

Specifically, according to Korean Patent Publication No. 10-2009-0065568, a reduction catalyst is manufactured by a method of dip coating a disc-type ceramic filter with a catalyst, and according to Korean Patent Publication No. 10-2007-0075044, a reduction catalyst is manufactured using a wash coating method, which is a method of spraying a catalyst on a cordierite honeycomb filter.

When applied to a filter having been studied for simultaneously treating dust and harmful gases, for example, a disc-type filter, it has been revealed that it is difficult to uniformly deposit a catalyst in the filter using dip coating or wash coating.

DISCLOSURE

Technical Problem

The present invention is directed to simply and effectively depositing a nano-catalyst in a filter using electrodeposition to uniformly deposit a nano-catalyst in a porous filter. In addition, the present invention is directed to utilizing a large and specific area of a nanostructure, thereby maximizing a catalyst's contact area with a gas, and ultimately improving a catalytic property.

Technical Solution

The present invention provides a method of manufacturing a nano-catalyst filter, wherein the method includes providing a porous filter to which an electrode layer is attached;
dipping said porous filter to which said electrode layer is attached into a plating bath filled with an electrolyte solution containing a nanowire catalyst precursor and nanoparticle catalyst precursor, and removing air in said porous filter by decompressing the plating bath; and performing electrodeposition;
wherein the nanowire catalyst and the nanoparticle catalyst are formed inside the porous filter, and
the nanoparticle catalyst is formed on the surface of the nanowire catalyst.

In addition, the present invention provides a nano-catalyst filter manufactured by the method of manufacturing a nano-catalyst filter as described above. The nano-catalyst filter includes a porous filter; and a nanowire catalyst and a nanoparticle catalyst formed inside the porous filter,
wherein the nanoparticle catalyst is formed on the surface of the nanowire catalyst.

Advantageous Effects

As a nano-catalyst filter according to the present invention is manufactured through electrodeposition, a nano-catalyst can be deposited in a porous filter, and high catalyst efficiency can be obtained only with a small amount of use of the catalyst.

Particularly, in the present invention, the nanowire catalyst and the nanoparticle catalyst can be separately formed using the difference in the reduction potential of the ions constituting the nanowire catalyst and the nanoparticle catalyst, respectively. As a result, it is possible to produce a nano-catalyst filter in which a nanowire catalyst having a nanowire structure and the nanoparticle catalyst having a nanoparticle structure inside the nano-catalyst filter are formed.

The nano-catalyst filter comprising the nanowire catalyst and the nanoparticle catalyst can have better catalytic efficiency.

DESCRIPTION OF DRAWINGS

FIG. 2(a) is an external image of the filter, and FIG. 2(b) is an SEM image of an interior of the filter.

FIGS. 3(a) and 3(b) are graphs showing an X-ray diffraction pattern of the nano-catalyst filter manufactured according to Example 1 of the present invention. Specifically, FIG. 3(a) is a graph of an X-ray diffraction pattern of a filter manufactured after electrodeposition, and FIG. 3(b) is a graph of an X-ray diffraction pattern of the filter manufactured by electrodeposition and subsequent calcination (heat treatment) at 600° C.

FIG. 4 is a scanning electron microscope (SEM) image of the nano-catalyst filter manufactured according to Example 1 of the present invention.

FIGS. 5(a) and 5(b) are SEM images of a nano-catalyst filter manufactured after electrodeposition according to Example 1 of the present invention. Specifically, FIG. 5(a) is an SEM image of a surface of the filter, and FIG. 5(b) is an SEM image of an interior of the filter.

FIGS. 6(a) and 6(b) are SEM images of a nano-catalyst filter manufactured by performing electrodeposition and calcination (heat treatment) according to Example 1 of the present invention. Specifically, FIG. 6(a) is an SEM image of a surface of the filter, and FIG. 6(b) is an SEM image of an interior of the filter.

FIG. 7(a) is a graph showing the $NO_x$ removal efficiency of the nano-catalyst filter after the electrodeposition was performed, and FIG. 7(b) is a graph showing the $NO_x$ removal efficiency of the nano-catalyst filter after both electrodeposition and calcination (heat treatment) were performed.

FIG. 8 is an image of a honeycomb-type ceramic filter used in Example 2 of the present invention.

FIGS. 9(a) and 9(b) are images of a nano-catalyst filter manufactured according to Example 2 of the present invention. Specifically, FIG. 9(a) is an external image of the manufactured filter, and FIG. 9(b) is an internal image of the filter.

FIG. 10(a) is an SEM image of the honeycomb-type ceramic filter after electrodeposition, and FIG. 10(b) is an SEM image of the honeycomb-type ceramic filter after electrodeposition and subsequent calcination (heat treatment).

FIG. 11(a) is a graph showing the $NO_x$ removal efficiency of the nano-catalyst filter after electrodeposition, and FIG. 11(b) is a graph showing the $NO_x$ removal efficiency of the nano-catalyst filter after electrodeposition and then calcination (heat treatment).

FIG. 14(a) is a graph showing the $NO_x$ removal efficiency of the nano-catalyst filter after electrodeposition and FIG. 14(b) is a graph showing the $NO_x$ removal efficiency of the nano-catalyst filter after electrodeposition and subsequent calcination (heat treatment).

FIG. 15(a) is schematic diagram for experimental preparation procedure of $MnO_2$—$CeO_2$ nanocatalysts, and FIG. 15(b) is schematic diagram for selective catalytic reaction of NOx with $NH_3$.

FIGS. 16(a), 16(b), 16(c) and 16D are images showing morphological and microstructural analyses of the nano-catalyst filter manufactured according to Example 4 of the present invention. Specifically, FIG. 16(a) and FIG. 16(b) are Low-magnification and high-magnification FESEM images of $MnO_2$—$CeO_2$ composite nanocatalysts on the cordierite filters. 16(c) is HRTEM image of $MnO_2$—$CeO_2$ composite nanocatalysts. 16(d) is SAED pattern of the ε-$MnO_2$—$CeO_2$ nanocatalyst.

FIG. 18(b) is $H_2$ TPR profiles. FIG. 19(a) is NOx conversion of $MnO_2$ NWs and $CeO_2$ NPs, and FIG. 19(b) is NOx conversion of $MnO_2$—$CeO_2$ nanocatalysts.

FIG. 21(a) and FIG. 21(b) are XPS spectra of Mn 2p(a) and O 1s(b).

BEST MODE

Figure 1:
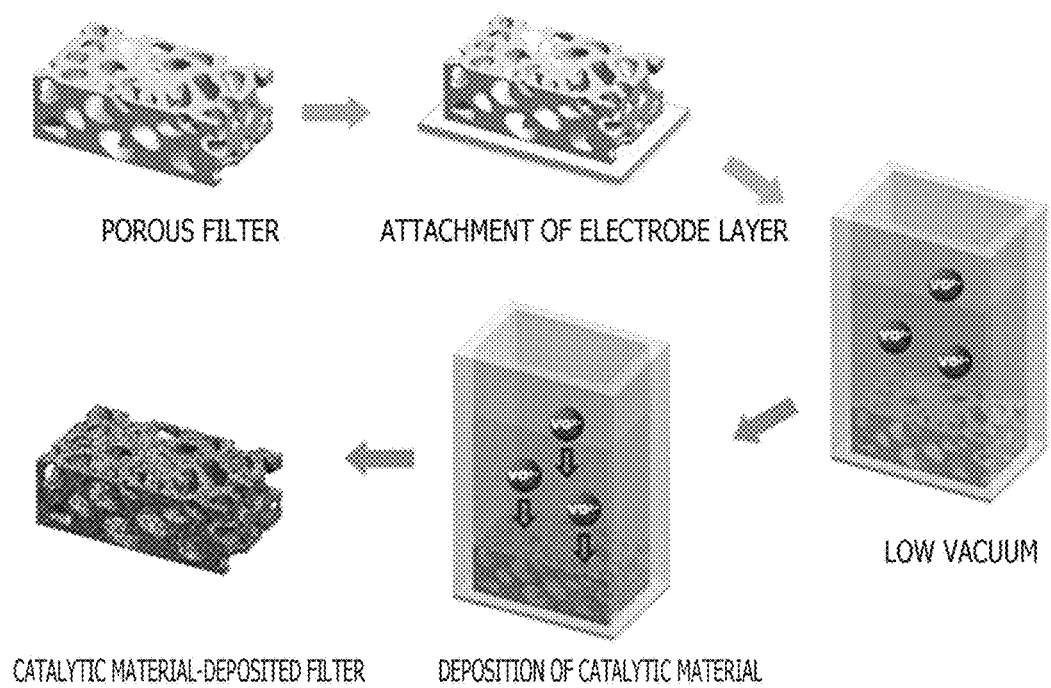
FIG. 1 is a schematic diagram illustrating a method of manufacturing a filter according to an exemplary embodiment of the present invention.

The present invention relates to a method of manufacturing a nano-catalyst filter, wherein the method includes providing a porous filter to which an electrode layer is attached; dipping said porous filter to which said electrode layer is attached into a plating bath filled with an electrolyte solution containing a nanowire catalyst precursor and nanoparticle catalyst precursor, and removing air in said porous filter by decompressing the plating bath; and performing electrodeposition.

Hereinafter, the method of manufacturing a nano-catalyst filter according to the present invention will be described in further detail.

In the present invention, the nano-catalyst filter refers to a filter in which a nano-catalyst is formed in an inner pore of a porous filter. The nano-catalyst includes a nanowire catalyst and a nanoparticle catalyst, and the nanoparticle catalyst may be formed on the surface of the nanowire catalyst.

In the present invention, the porous filter has a porous structure in the filter.

Such a porous filter may have a porosity of 40% or less, preferably, 30% or less, a strength of 10 MPa or more, preferably, 20 MPa or more, and a pressure loss of 3000 Pa or less, preferably, 2000 Pa or less at a face velocity of 5 cm/sec. Here, the porosity is measured by the Archimedes method, the strength is measured using a universal testing machine (UTM), and the pressure loss is measured using a manometer.

The porous filter serves as a carrier, and a nano-catalyst is formed by electrodeposition, and thereby the filter has an excellent effect of treating harmful gas, specifically, an effect of removing nitrogen oxides.

A material such a porous filter is not particularly limited, and may include at least one selected from the group consisting of ceramic, alumina ($Al_2O_3$), silica, mullite ($3Al_2O_3.SiO_2$), zeolite, zirconia ($ZrO_2$), titanium dioxide ($TiO_2$), silicon carbide (SiC) and cordierite ($2MgO_2.Al_2O_3.SiO_2$), and preferably, ceramic or cordierite.

In addition, a type of the porous filter may be, but is not particularly limited to, a disc type or a honeycomb type porous filter.

In addition, the nano-catalyst originates from a nano-catalyst precursor and is formed in a porous filter by electrodeposition.

The nano-catalyst may include nanowire (NW) catalysts and nanoparticles (NP) catalysts.

The nanowire catalyst may be a nanowire shaped catalyst having a diameter of 5 to 50 nm and a length of 20 to 200 nm. In addition, the nanoparticle catalyst may be a nanoparticle shaped catalyst having an average particle diameter of 1 to 10 nm. In the porous filter of the present invention, the nanowire catalyst may be formed inside the filter, and the nanoparticle catalyst may be formed on the surface of the nanowire catalyst.

A material such a nano-catalyst, that is, the nanowire catalyst and the nanoparticle catalyst is not particularly limited, and may include at least one selected from the group consisting of a metal oxide, a transition metal, a noble metal or a rare earth metal. Specifically, the metal oxide may be titanium oxide ($TiO_2$), cerium oxide ($CeO_2$), zirconium oxide ($ZrO_2$), magnesium oxide (MgO), copper oxide (CuO), tungsten oxide ($WO_3$), nickel oxide ($NiO_x$), cobalt oxide ($CoO_x$), manganese oxide ($MnO_x$), vanadium oxide ($VO_x$), iron oxide ($FeO_x$), gallium oxide ($GaO_x$), cesium oxide ($SeO_x$) or molybdenum oxide ($MoO_x$); the transition metal may be scandium (Sc), titanium (Ti), chromium (Cr), manganese (Mn), iron (Fe), cobalt (Co), nickel (Ni), zirconium (Zr), niobium (Nb), molybdenum (Mo), technetium (Tc), lead (Pb), bismuth (Bi), germanium (Ge) or zinc (Zn); the noble metal may be silver (Ag), gold (Au), platinum (Pt), ruthenium (Ru), rhodium (Rh), palladium (Pd), osmium (Os) or iridium (Ir); and the rare earth metal may be lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) or yttrium (Y).

In the present invention, the nanowire catalyst may be at least one selected from the group consisting of manganese oxide ($MnO_2$) and vanadium oxide ($VO_x$), and the nanoparticle catalyst may be at least one selected from the group consisting of cerium oxide ($CeO_2$) and calcium oxide (CaO).

In the present invention, the nano-catalyst precursor is a compound deposited inside the ceramic filter in the form of a nano-catalyst through electrodeposition.

A type of such a nano-catalyst precursor, that is, the nanowire catalyst precursor and the nanoparticle catalyst precursor are not particularly limited, and may include at least one selected from the group consisting of a metal oxide precursor, a transition metal precursor, a noble metal precursor and a rare earth metal precursor.

Here, types of the metal oxide precursor, the transition metal precursor, the noble metal precursor and the rare earth metal precursor are not particularly limited, as long as the above-described metal oxide, transition metal, noble metal and rare earth metal can be present in an ionized state in an electrolyte solution.

In the present invention, the formation of the nano-catalyst inside the porous filter may be performed using electrodeposition.

Figure 15A:
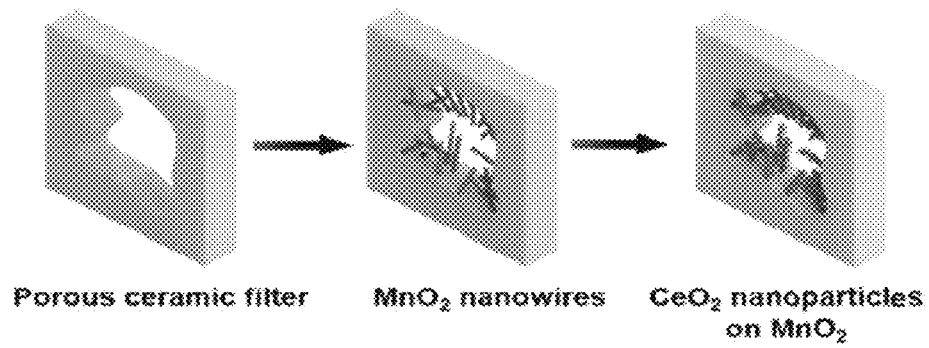
FIGS. 15(a) and 15(b) are schematic diagrams illustrating a method of manufacturing a filter ($MnO_2$—$CeO_2$ nanocatalysts filter) according to Example 4 of the present invention. Specifically.
Figure 15B:
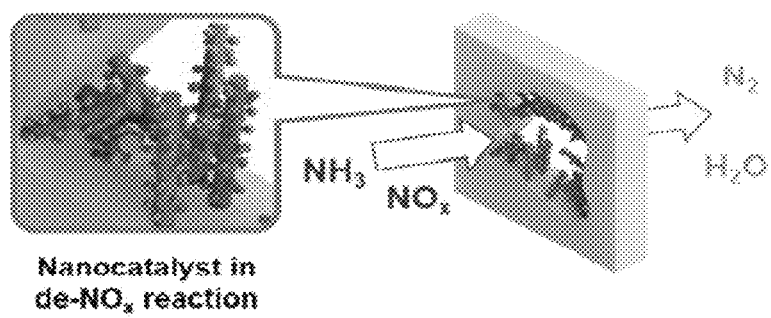

For example, the manufacture of the nano-catalyst filter using electrodeposition may be performed using a method illustrated in FIG. 1 or FIG. 15. The manufacture of the nano-catalyst filter according to FIG. 1 may be performed by first attaching an electrode layer to a porous filter, dipping the porous filter to which the electrode layer is attached into a plating bath filled with an electrolyte solution containing a catalyst precursor, and performing electrodeposition.

Specifically, the nano-catalyst filter may be manufactured by providing a porous filter to which an electrode layer is attached; dipping said porous filter to which said electrode layer is attached into a plating bath filled with an electrolyte solution containing a nanowire catalyst precursor and nanoparticle catalyst precursor, and removing air in said porous filter by decompressing the plating bath; and performing electrodeposition (FIG. 15).

Here, a concentration of the nano-catalyst precursor in the electrolyte solution may be, but is not particularly limited to, 0.01 to 30 M (mole), preferably, 0.03 to 10 M, and more preferably, 0.05 to 5 M.

Also, the concentration of nanowire catalyst precursor is 0.01 to 100 mmol, and the concentration of nanoparticle catalyst precursor is 1 mmol to 1 mol. Within this range, it is easy to uniformly deposit a nano-catalyst onto the porous filter.

A pH of the electrolyte solution may be maintained at 1 to 5 for the nano-catalyst precursor to be present as ions, and particularly, cations. To maintain the pH of the electrolyte solution within this range, the electrolyte solution may contain an acidic solution. Here, as the acidic solution, nitric acid, sulfuric acid, hydrochloric acid, boric acid, oxalic acid, acetic acid, phosphoric acid or a mixture thereof may be used.

In the present invention, decompression may be performed to remove air in the porous filter, thereby facilitating the nano-catalyst formation.

The decompression may be performed in a low vacuum or a vacuum state, and a pressure range may be 100 kPa to 100 mPa, and preferably, 500 kPa to 50 mPa. The internal pressure after the pressure reduction may be 0.200 Pa or less. In addition, the decompression may be performed for 10 minutes to 5 hours, and preferably, for 30 minutes to 3 hours.

In the present invention, electrodeposition may be performed at a current range of 0.1 to 300 $mA/cm^2$, and preferably, 1 to 40 $mA/cm^2$. At this current range, it is easy to uniformly deposit the nano-catalyst precursor.

In the present invention, the electrodeposition may be performed by applying the current of 0.1 to 10 $mA/cm^2$ or 1 or 8 $mA/cm^2$, and then applying the current of 10 to 100 $mA/cm^2$ or 15 to 40 $mA/cm^2$.

In addition, electrodeposition may be performed for 10 minutes to 48 hours, and preferably 3 to 24 hours. The time may vary according to a size or height of the porous filter, and in the above-described range of time, it is easy to uniformly deposit the nano-catalyst precursor.

In the present invention, after the electrodeposition is performed, a drying step may be additionally included. Here, drying may be generally performed at 50 to 100° C., although the temperature may vary depending on the type of the nano-catalyst precursor and is not particularly limited thereto. The drying may be performed for 1 to 24 hours.

Moreover, in the present invention, after the electrodeposition is performed, a calcination (heat treatment) operation may be additionally included. An efficiency of the catalyst may be maximized further by the calcination.

Here, calcination may be generally performed at 100 to 1000° C., although the temperature may vary depending on the type of the nano-catalyst precursor and is not particularly limited thereto. The calcination may be performed for 1 to 24 hours, and preferably, 3 to 20 hours. In this range, a filter having excellent catalytic activity may be easily manufactured.

In the present invention, nanowire catalysts and nanoparticle catalysts can be sequentially eletrodeposited to synthesize dimensionally integrated nanostructures. This structure can provide high de-NOx efficiencies over a broad range of operating temperatures because of its large surface area and heterostructure (See FIG. 15). In addition, the method of the present invention is simple and straightforward in contrast to conventional processes such as dip coating and wash coating methods, where the catalyst synthesis, coating, and heat treatment steps are carried out separately.

Particularly, in the present invention, the nano-catalyst filter in which $MnO_2$ nanowire-$CeO_2$ nanoparticle composite catalysts are formed inside the porous filter can be manufactured.

$MnO_2$, particularly ε-$MnO_2$, could be a potential candidate for a de-NOx catalyst because it has more structural defects than other polymorphs that serve as active sites for the catalytic reaction. Additionally, $CeO_2$ NPs not only have high de-NOx efficiencies at high temperatures but also act as co-catalysts and enhance the de-NOx efficiency of MnOx owing to the high mobility of $Ce^{3+}$ and $Ce^{3+}$ ions with $O^{2-}$ and high oxygen storage capacity. Both $MnO_2$ and $CeO_2$ are known to be environmentally compatible and offer long-term catalytic stability, excellent resistance to sulfur and water, and high $N_2$ selectivity.

In addition, the present invention relates to a nano-catalyst filter manufactured by the above-described method of manufacturing the nano-catalyst filter.

The nano-catalyst filter according to the present invention may include a porous filter; and the nanowire catalyst and the nanoparticle catalyst formed inside the porous filter. The nanoparticle catalyst is formed on the surface of the nanowire catalyst.

In the present invention, the weight ratio of the nanowire catalyst and the nanoparticle catalyst may be 1:9 to 9:1 or 3:7 to 7:3.

In the present invention, the type of the nano-catalyst, that is, the nanowire catalyst and the nanoparticle is not particularly limited, and may include at least one selected from the group consisting of a metal oxide, a transition metal, a noble metal and a rare earth metal. Specifically, the metal oxide may be titanium oxide ($TiO_2$), cerium oxide ($CeO_2$), zirconium oxide ($ZrO_2$), magnesium oxide (MgO), copper oxide (CuO), tungsten oxide ($WO_3$), nickel oxide ($NiO_x$), cobalt oxide ($CoO_x$), manganese oxide ($MnO_x$), vanadium oxide ($VO_x$), iron oxide ($FeO_x$), gallium oxide ($GaO_x$), selenium oxide ($SeO_x$) or molybdenum oxide ($MoO_x$); the transition metal may be scandium (Sc), titanium (Ti), chromium (Cr), manganese (Mn), iron (Fe), cobalt (Co), nickel (Ni), zirconium (Zr), niobium (Nb), molybdenum (Mo), technetium (Tc), lead (Pb), bismuth (Bi), germanium (Ge) or zinc (Zn); the noble metal may be silver (Ag), gold (Au), platinum (Pt), ruthenium (Ru), rhodium (Rh), palladium (Pd), osmium (Os) or iridium (Ir); and the rare earth metal may be lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) or yttrium (Y).

Mode for Invention

The present invention will become more apparent by reference to exemplary embodiments in which advantages and characteristics of the present invention, and methods of accomplishing the same are described in detail. However, the present invention is not limited to the following examples, but will be realized in various formations. The examples are merely provided to complete the disclosure of the present invention and to fully inform those of ordinary skill in the art of the scope of the present invention, and defined by the range of the claims of the present invention.

Example 1: Synthesis of VO on Disc-Type Filter

As a porous filter, cordierite ($2MgO_2.Al_2O_3.SiO_2$) was used. The ceramic filter was attached to a platinum (Pt) electrode plate, and then dipped into a plating bath. Here, a plating bath was filled with an electrolyte solution containing ammonium vanadate ($NH_4VO_3$ 116.99 g/mol) at a concentration of 0.05 M, and nitric acid ($HNO_3$) was added to the electrolyte solution to adjust a pH level to the range of 1.2 to 2.5.

To remove air in the porous filter, an inner pressure of the plating bath was reduced to 86 kPa using a low vacuum pump for 20 minutes before the electrodepositing was performed.

For the electrodeposition, a current of 20 $mA/cm^2$ was applied, and a cordierite filter deposited with a $VO_x$ nano-catalyst was manufactured.

The manufactured filter was calcinated at 600° C. for 1 hour.

Figure 2A:
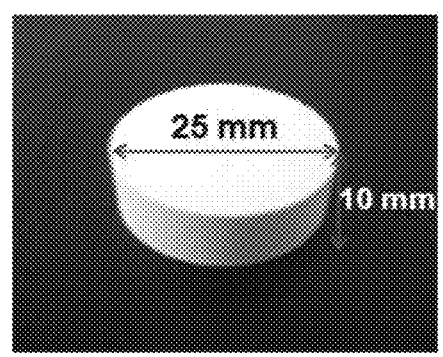
FIGS. 2(a) and 2(b) are images of a disc-type cordierite filter used in Example 1 of the present invention. Specifically.
Figure 2B:
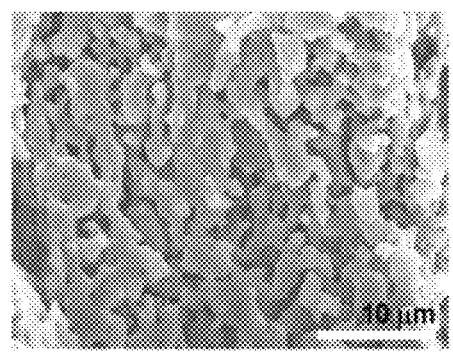

In the present invention, FIG. 2 is an image of a cordierite filter used in Example 1. FIG. 2(a) is an external image of the filter, and as shown in FIG. 2(a), a cordierite filter having a diameter of 25 mm and a height of 10 mm was used in Example 1 of the present invention. In addition, FIG. 2(b) is an SEM image of an interior of the filter, and as shown in FIG. 2(b), it can be confirmed that pores having several micrometers or more were relatively uniformly formed in the cordierite filter.

FIG. 3 is a graph of an X-ray diffraction pattern of the nano-catalyst filter manufactured according to Example 1 of the present invention, and specifically, FIG. 3(a) is a graph of an X-ray diffraction pattern of a filter manufactured after electrodeposition, and FIG. 3(b) is a graph of an X-ray diffraction pattern of the filter manufactured by electrodeposition and subsequent calcination (heat treatment) at 600° C. As shown in FIG. 3, (a) it can be confirmed that vanadium oxide ($VO_x$) crystals were formed after the electrodeposition, and (b) it can be confirmed that vanadium pentoxide ($V_2O_5$) crystals were formed after calcination.

FIG. 4 is an SEM image of a nano-catalyst microstructure manufactured according to Example 1 of the present invention. As shown in FIG. 4, it can be confirmed that the nano-catalyst is formed in a nano-fiber structure having a specific and large surface area.

FIG. 5 is an SEM image of the nano-catalyst filter manufactured after electrodeposition in Example 1. Specifically, FIG. 5(a) is an SEM image of a surface of the filter, and FIG. 5(b) is an SEM image of an interior of the filter, and it can be confirmed from FIG. 5 that $VO_x$ is deposited effectively on the surface and interior of the filter.

FIG. 6 is an SEM image of a nano-catalyst filter manufactured by electrodeposition and then calcination (heat treatment) as in Example 1 of the present invention. Specifically, FIG. 6(a) is an SEM image of a surface of the filter, and FIG. 6(b) is an SEM image of an interior of the filter, and it can be confirmed from FIG. 6 that $V_2O_5$ is deposited into a nano-wire structure inside the pores of the filter.

Referring to Table 1, it can be confirmed from X-ray fluorescence (XRF) analysis data for the nano-catalyst filter manufactured according to Example 1 that a VOx nano-catalyst was deposited at a concentration of 10 wt % or more.

TABLE 1

| Material | MgO | $Al_2O_3$ | $SiO_2$ | VO$x$ | Etc. |
| --- | --- | --- | --- | --- | --- |
| As-deposition | 8.05 | 29.8 | 48.6 | 10.5 | 3.05 |
| heat treatment at 600° C. | 7.91 | 29.2 | 47.5 | 12.3 | 3.09 |

Figure 7A:
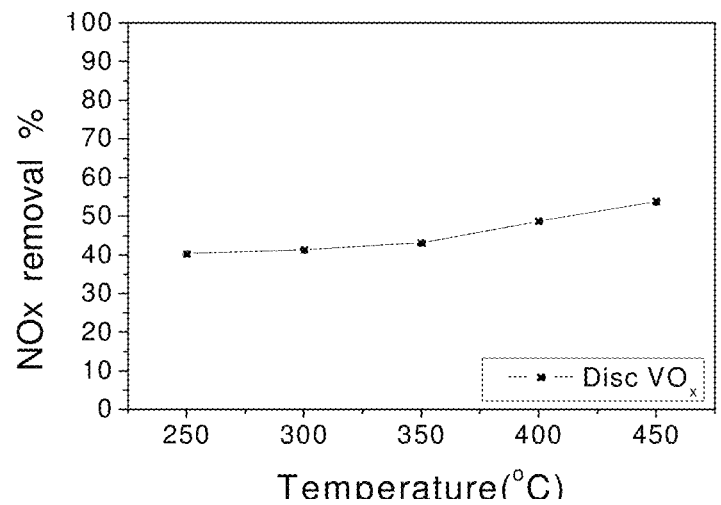
FIGS. 7(a) and 7(b) are graphs showing NOx removal efficiency of the nano-catalyst filter manufactured according to Example 1 of the present invention. Specifically.
Figure 7B:
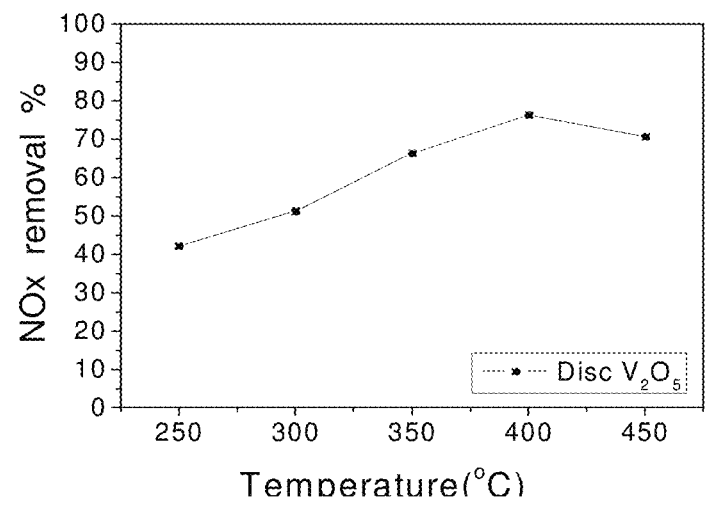

In addition, FIG. 7 is a graph showing $NO_x$ removal efficiency of the nano-catalyst filter manufactured according to Example 1 of the present invention. More specifically, FIG. 7(a) is a graph showing the $NO_x$ removal efficiency of the nano-catalyst filter after the electrodeposition was performed, and FIG. 7(b) is a graph showing the $NO_x$ removal efficiency of the nano-catalyst filter after both electrodeposition and calcination (heat treatment) were performed. As shown in FIG. 7, it can be confirmed that the $NO_x$ removal efficiency is 53% at a maximum before calcination and 76% at a maximum after calcination, and that $NO_x$ removal efficiency upon calcination is excellent.

Example 2: VOx Synthesis on a Honeycomb-Type Filter

A filter was manufactured by the same method as described in Example 1, except that a honeycomb-type ceramic filter was used as a porous filter.

In the present invention, FIG. 8 is an image of a honeycomb-type porous filter used in Example 2 of the present invention.

FIG. 9 is an image of a nano-catalyst filter after electrodeposition by the method described in Example 2 of the present invention, and specifically, FIG. 9(a) is an external image of the manufactured filter, and FIG. 9(b) is an internal image of the filter.

Figure 10A:
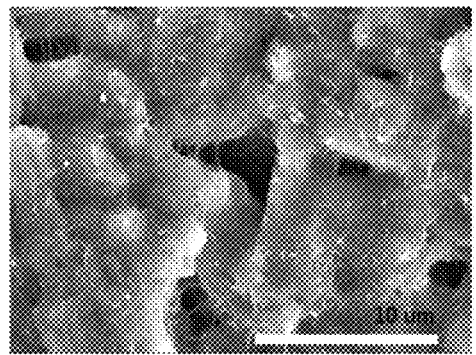
FIGS. 10(a) and 10(b) are SEM images of the nano-catalyst filter manufactured according to Example 2 of the present invention. Specifically.
Figure 10B:
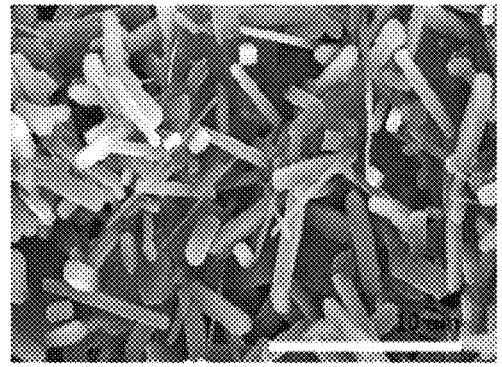

FIG. 10 is an SEM image of the nano-catalyst filter manufactured according to Example 2, and specifically, FIG. 10(a) is an SEM image of the honeycomb-type ceramic filter after electrodeposition, and FIG. 10(b) is an SEM image of the honeycomb-type ceramic filter after electrodeposition and subsequent calcination (heat treatment). As shown in FIG. 10(b), it can be confirmed that $V_2O_5$ is deposited in a nano-wire structure inside pores of the filter upon calcination.

Referring to Table 2, it can be confirmed from X-ray fluorescence (XRF) analysis data of the nano-catalyst filter manufactured according to Example 2 of the present invention that a $VO_x$ nano-catalyst was deposited at a concentration of 14 wt % or more.

TABLE 2

| Material | MgO | $Al_2O_3$ | $SiO_2$ | $VO_x$ | Etc. |
|---|---|---|---|---|---|
| As-deposition | 7.71 | 27.3 | 46.0 | 14.0 | 4.99 |
| heat treatment at 600° C. | 7.26 | 26.1 | 43.0 | 18.3 | 5.34 |

Figure 11A:
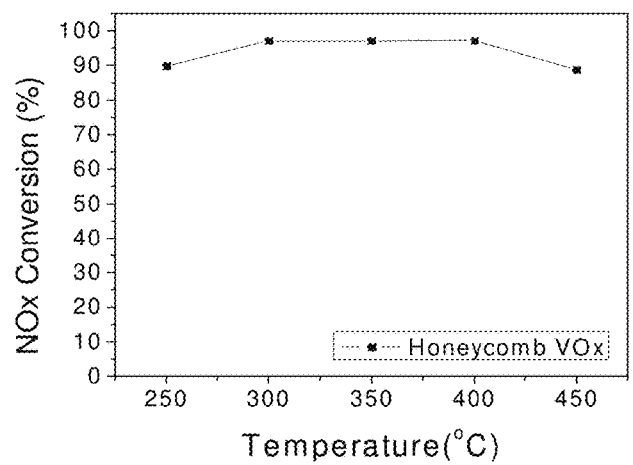
FIGS. 11(a) and 11(b) are graphs showing NOx removal efficiency of the nano-catalyst filter manufactured according to Example 2 of the present invention. Specifically.
Figure 11B:
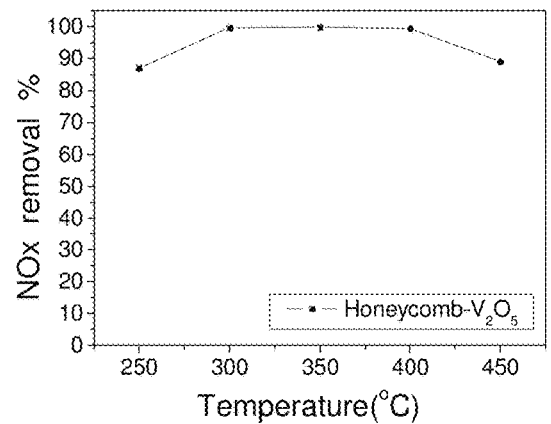

In addition, FIG. 11 is a graph showing $NO_x$ removal efficiency of the nano-catalyst filter manufactured according to Example 2 of the present invention, and specifically, FIG. 11(a) is a graph showing the $NO_x$ removal efficiency of the nano-catalyst filter after electrodeposition, and FIG. 11(b) is a graph showing the $NO_x$ removal efficiency of the nano-catalyst filter after electrodeposition and then calcination (heat treatment). As shown in FIG. 11, the $NO_x$ removal efficiency is 97% at a maximum before calcination, and 99% at a maximum after calcination.

Example 3: $CeO_2$ Synthesis on a Disc-Type Filter

A disc-type filter was used as a porous filter. The filter was attached to an electrode plate and dipped into a plating bath. Here, the plating bath was filled with a cerium (III) nitrate hexahydrate ($Ce(NO_3)_3.H_2O$ g/mol) electrolyte solution at a concentration of 1 M, to which nitric acid ($HNO_3$) was added to adjust a pH level in the range of 1.2 to 3.5.

To remove air in the porous filter, pressure in the plating bath was reduced to 86 kPa using a low vacuum pump for 20 minutes before electrodeposition was performed.

For electrodeposition, a current of 10 $mA/cm^2$ was applied, and a $CeO_2$ nano-catalyst-deposited disc-type ceramic filter was manufactured.

Figure 12:
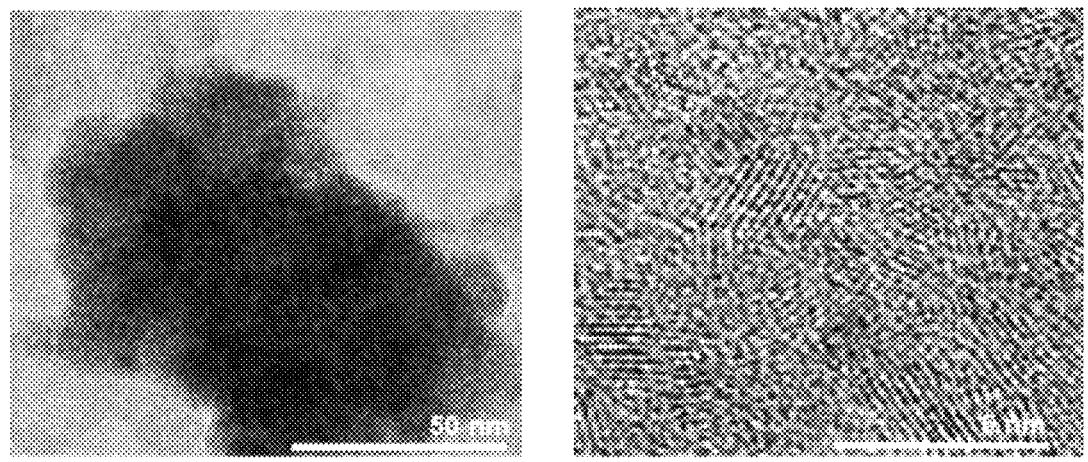
FIG. 12 is a transmission electron microscope (TEM) image of a nano-catalyst filter manufactured according to Example 3 of the present invention.

In the present invention, FIG. 12 is a TEM image of a nano-catalyst filter manufactured according to Example 3 of the present invention. As shown in FIG. 12, it can be confirmed that a nano-catalyst having a nano-particle structure with a diameter of 5 nm or less was formed inside the filter.

Figure 13:
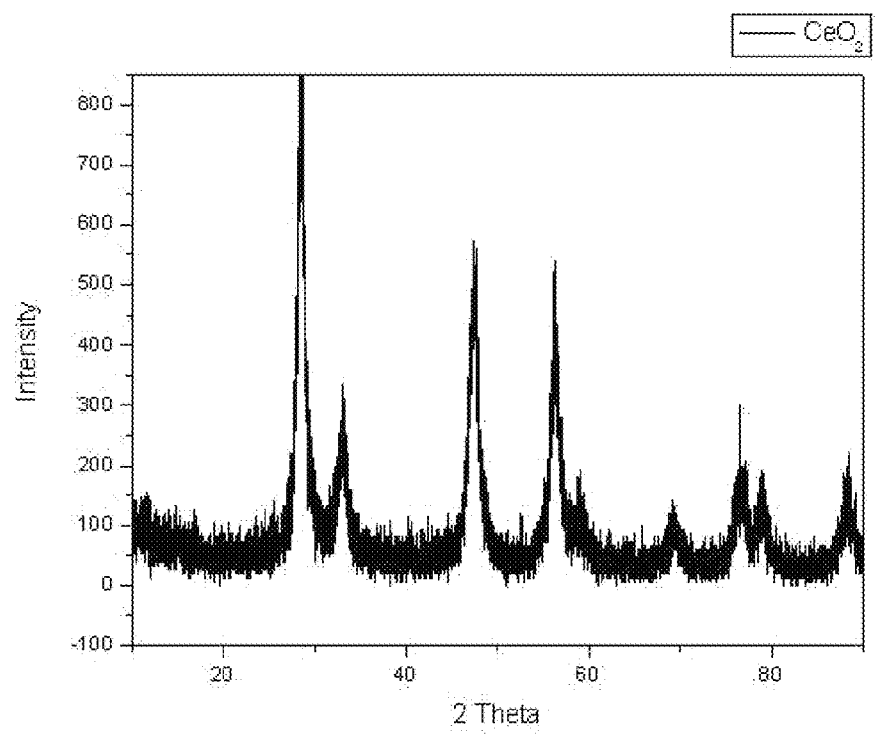
FIG. 13 is a graph of a $CeO_2$ X-ray diffraction pattern of the nano-catalyst filter manufactured according to Example 3 of the present invention.

FIG. 13 is a graph of a $CeO_2$ X-ray diffraction pattern of the nano-catalyst filter manufactured according to Example 3, and referring to FIG. 13, it can be confirmed that cerium oxide was formed inside the pores of the filter.

Referring to Table 3, it can be confirmed from XRF analysis data of the nano-catalyst filter manufactured according to Example 3 that a $CeO_2$ nano-catalyst was deposited at a concentration of 28 wt % or more.

TABLE 3

| Material | MgO | $Al_2O_3$ | $SiO_2$ | $CeO_2$ | Etc. |
|---|---|---|---|---|---|
| As-deposition | 6.85 | 24.8 | 36.8 | 28.8 | 2.75 |
| heat treatment at 500° C. | 6.57 | 23.8 | 35.2 | 31.4 | 3.03 |

Figure 14A:
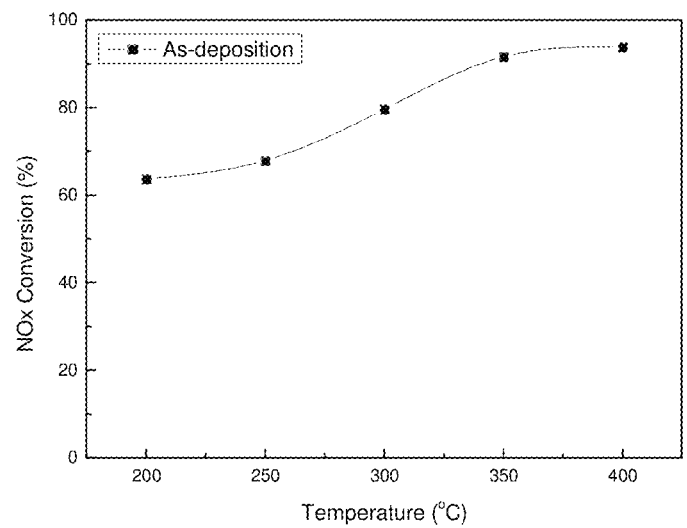
FIGS. 14(a) and 14(b) are graphs showing NOx removal efficiency of the nano-catalyst filter manufactured according to Example 3 of the present invention. Specifically.
Figure 14B:
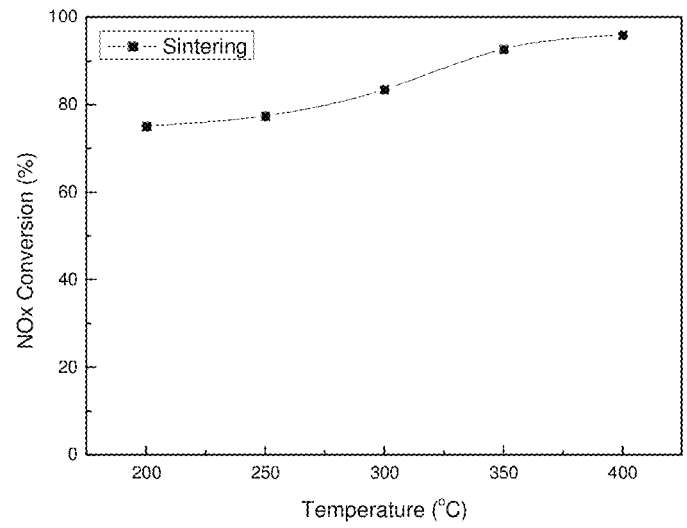

In addition, FIG. 14 is a graph showing $NO_x$ removal efficiency of the nano-catalyst filter manufactured according to Example 3 of the present invention, and specifically, FIG. 14(a) is a graph showing the $NO_x$ removal efficiency of the nano-catalyst filter after electrodeposition and FIG. 14(b) is a graph showing the $NO_x$ removal efficiency of the nano-catalyst filter after electrodeposition and subsequent calcination (heat treatment). The $NO_x$ removal efficiency was measured at a maximum of 93% before calcination, and at a maximum of 95% after calcination.

Example 4: Synthesis of $MnO_2$ Nanowire-$CeO_2$ Nanoparticle Composite Catalysts on a Disc-Type Filter (1) Synthesis of Cordierite Disc-Type Filter A ceramic filter (disc-type filter) of cordierite ($3(2MgO.2Al_2O_3.5SiO_2)$) powder with a mean particle size of 150 μm was prepared by first aging the powder for 24 h in a thermo-hygrostat and then adding a binder (methyl cellulose), a plasticizer (glycerin), a lubricant (Lu-6418), and water.

The ceramic filters were fabricated by the pressing method using a disk-type mold (25 mm diameter). The ceramic filters were first dried at room temperature and then at 100° C. for 24 h. The dried ceramic filters were then sintered at 1410° C. The fabricated filters should exhibit a porosity of 40%, a strength of more than 10 MPa, and a face velocity of less than 5 cm/s.

(2) Synthesis of $MnO_2$ Nanowire-$CeO_2$ Nanoparticle Composite Catalysts

For preparing the $MnO_2$ nanowire-$CeO_2$ nanoparticle composite catalysts ($MnO_2$—$CeO_2$ nanocatalysts) via the one-bath electrodeposition method, 10 mmol of manganese (II) sulfate monohydrate ($MnSO_4.H_2O$) and 50 mmol of cerium(III) nitrate-6-hydrate ($Ce(NO_3)_3.6H_2O$, crown) were added to obtain the precursor solution, and sulfuric acid ($H_2SO_4$) was then used to adjust the solution pH to 2-2.5.

A Pt plate was used as both anode and cathode. The filter was positioned at the cathode. The inner pressure of the bath was decreased to below 0.133 Pa by using a vacuum pump to facilitate the penetration of the inner pores by the mixed solution. The difference between the standard potentials and the diffusion rates of $Mn^{2+}$ and $Ce^{3+}$ ions can cause separate formation of ε-$MnO_2$ NWs and $CeO_2$ NPs. Pulsed electrodeposition of $MnO_2$ and $CeO_2$ was carried out with pulses of 5 and 20 mA/cm² for 2, 4, and 6 h that were produced using a Keithley 2400 power station. First, the ε-$MnO_2$ NWs were deposited at an amount below 5 mA/cm² on the filter positioned on the Pt plate. Subsequently, the $CeO_2$ NPs were deposited on the $MnO_2$ NWs at an amount below 20 mA/cm².

(3) Morphological and Microstructural Properties

The morphological and microstructural properties of the nano-catalyst on the filter were analyzed with field emission scanning electron microscopy (FESEM) (Hitachi S-4300) and transmission electron microscopy (TEM) (JEOL JEM-2100F).

As shown in FIG. 16 a,b, the $MnO_2$ NW—$CeO_2$ NP composite catalysts were successfully deposited on the surface of the filter. The $MnO_2$ NWs with a length of 109 nm and diameter of 22 nm were formed on the surface of the filter before the formation of small-sized $CeO_2$ NPs. The $CeO_2$ NPs were frequently observed on the $MnO_2$ NWs and filled the vacant surface of the filter. The $CeO_2$ NPs formed as aggregated clusters consisting of several NPs. In more detail, single-crystalline $CeO_2$ NPs of sizes 2-3 nm were confirmed to be present on the $MnO_2$ NWs based on the HRTEM and fast Fourier transform (FFT) images shown in FIG. 16 c.

The $CeO_2$ NPs in the yellow circled area of FIG. 16 c reveal the fringes of the (200) planes, with d(200)=0.267 nm obtained from the FFT (inset) image.

FIG. 16 d displays the selected area of the electron diffraction (SAED) patterns of the heteronanostructure measured by using an aperture of 170 nm. The diffraction spots of the $MnO_2$ NWs and the $CeO_2$ NPs reveal a hexagonal closed packed (hcp) structure and a fluorite structure with face-centered cubic unit cells, respectively. The d-spacings estimated from the (200) and (400) SAED spots of the $CeO_2$ NPs were 0.267 and 0.136 nm, respectively, whereas those of the (100), (101), and (102) SAED spots of the $MnO_2$ nanowires were 0.242, 0.215, and 0.168 nm, respectively.

(4) Crystal Structure Analysis

Crystal structure analysis was performed by Xray diffraction (XRD) (PANalytical X'Pert Pro) using Cu Kα radiation in the diffraction spectrum of 20°<2θ<70° with a scanning speed of 2°/min.

Figure 17:
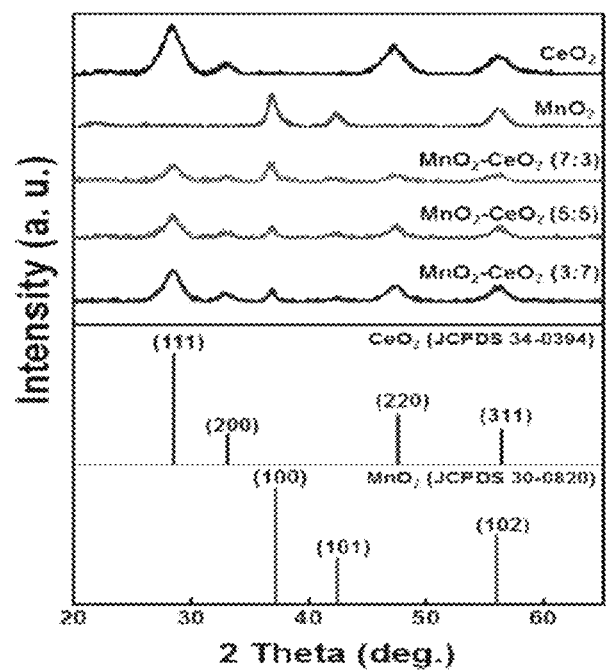
FIG. 17 is a graph showing XRD patterns of the $MnO_2$ NWs, $CeO_2$ NPs, and $MnO_2$—$CeO_2$ nanocatalysts with different weight percentage ratios.

The XRD patterns shown in FIG. 17 clearly verify the structures of $MnO_2$ and $CeO_2$, and as represented by the SAED, there was no difference in their crystal structure and morphology.

Hydroxyl (OH—) anions could be formed near the cathode through nitrate reduction and the electrolysis of water. Subsequently, $Mn^{2+}$ and $Ce^{3+}$ (cations) could react with $OH^-$ (anion). The $Mn(OH)_2$ and $Ce(OH)_3$ thus formed were then transformed to $MnO_2$ and $CeO_2$, respectively, because both hydroxides are relatively unstable (See Equation 1).

[Equation 1]

  (1)

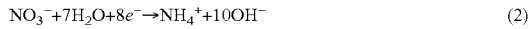  (2)

  (3)

  (4)

  (5)

  (6)

The relative proportions of $MnO_2$ NWs and $CeO_2$ NPs could be controlled by varying the duration of current application for each component. As shown in FIG. 17, the diffraction intensity of the nanocatalysts was changed according to the weight ratio of $MnO_2$ NWs to $CeO_2$ NPs.

(5) Chemical Quantitative Analysis

Chemical quantitative analysis was carried out by X-ray fluorescence (XRF) (Rigaku ZSK).

The specific contents of the $MnO_2$ NWs and $CeO_2$ NPs in the nanocatalysts were estimated by XRF. The XRF results of the $MnO_2$—$CeO_2$ nanocatalysts with content ratios of 7:3, 5:5, and 3:7 were 7.18:3.13, 4.82:5.09, and 2.92:6.99 (wt %), respectively.

(6) Characterization of Catalytic Activity

The $NH_3$—SCR activity and the relevant characteristics of the $MnO_2$—$CeO_2$ nanocatalysts with content ratios of 10:0, 7:3, 5:5, 3:7, and 0:10 were estimated. It is well known that the redox properties of catalysts in the $NH_3$—SCR of NO are highly related to the catalytic cycle. The $H_2$ TPR measurements were used to evaluate the reducibility of the catalysts.

(A) NOx Conversion

The inlet gas consisted of NO (1000 ppm), $NH_3$ (1000 ppm), $O_2$ (5%), and balance $N_2$.

The flow rate was controlled by a mass flow controller. The gaseous hourly space velocity (GHSV) was 10000 h⁻¹. The NO concentrations of the inlet and outlet streams were measured using a NOx analyzer (Thermo, 42C). The NOx removal efficiency was calculated as follows:

$$NO_x \text{ removal efficiency} = \frac{[NO_{x,in}] - [NO_{x,out}]}{[NO_{x,in}]} \times 100$$

where [NOx, in] and [NOx, out] are the inlet and outlet concentrations of NOx.

(B) $H_2$ TPR $H_2$ TPR was performed with a TPR/TPD analyzer (BEL-CAT, BEL Japan Inc.) with an autoadsorption apparatus. Before the $H_2$ TPR experiment, 50 mg of the catalysts was pretreated with $N_2$ at the total flow rate of 30 mumin at 300° C. for 0.5 h and then cooled to room temperature in the $N_2$ atmosphere. Finally, the temperature was raised to 800° C. at the constant heating rate of 10° C./min in a flow of $H_2$ (5 vol %)/$N_2$ (30 mL/min).

For the $MnO_2$ NWs, the $H_2$ TPR profile presents two well-defined reduction peaks at around 323 and 426° C. The first peak represents the reduction of $Mn^4$ to $Mn^3$, whereas the second one refers to further reduction of $Mn^{3+}$ to $Mn^{2+}$. In the case of the $CeO_2$ NPs, a peak at 400° C. was observed, which was attributed to the reduction of $Ce^{4+}$ to $Ce^{3+}$. The analysis of the $H_2$-reducing capability of the catalysts showed that the $MnO_2$ NWs exhibited the highest NOx removal efficiency at 300° C., whereas the $CeO_2$ NPs showed the best NOx removal efficiency at 400° C. (FIG. 19 a).

In addition, the present invention evaluated the NOx removal efficiency of the nanocatalysts based on the content ratio of $MnO_2$ to $CeO_2$.

Figure 19A:
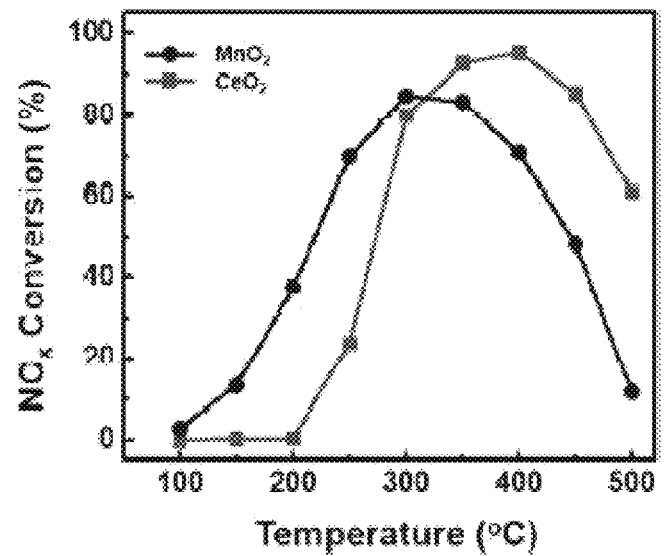
Figure 19B:
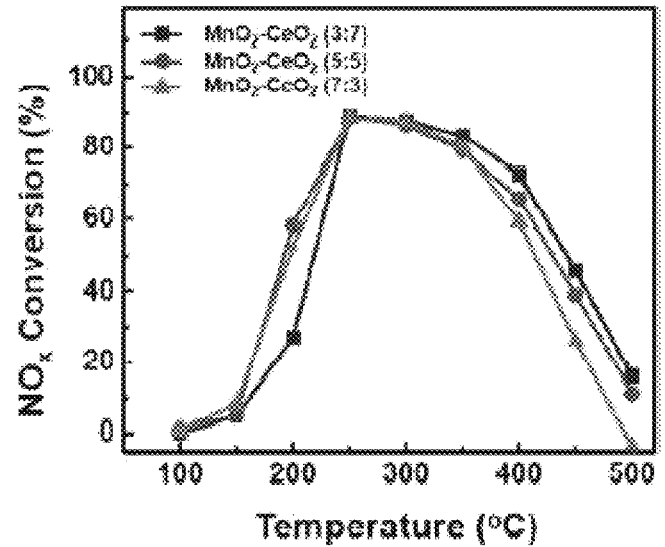

As shown in FIG. 19 b, the catalytic activity of all the samples is the highest (90%) at around 250-300° C. Considering that the NOx conversion efficiency of the $MnO_2$ NW—$CeO_2$ NP composite catalysts was determined by combining the catalytic properties of the $MnO_2$ NWs and the $CeO_2$ NPs, it can be accepted that the optimal reaction window is 250-300° C. for all the samples. Furthermore, we could identify the distinct changes according to the relative proportions of $MnO_2$ NWs and $CeO_2$ NPs, especially in the relatively low- (150-200° C.) and high-temperature (350-500° C.) regions.

Figure 18A:
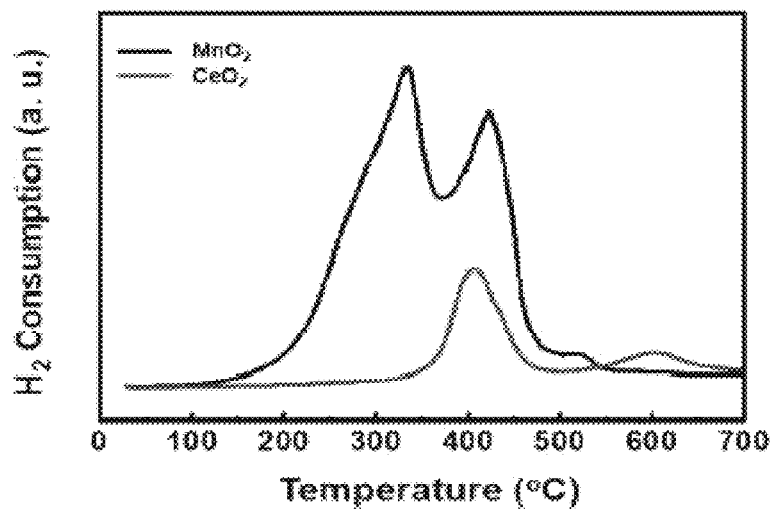
FIGS. 18(a), 18(b), 19(a) and 19(b) are graphs showing catalytic activity of $MnO_2$ NWs, $CeO_2$ NPs and $MnO_2$—$CeO_2$ nanocatalysts. Specifically, FIG. 18(a) $H_2$ TPR profiles.
Figure 18B:
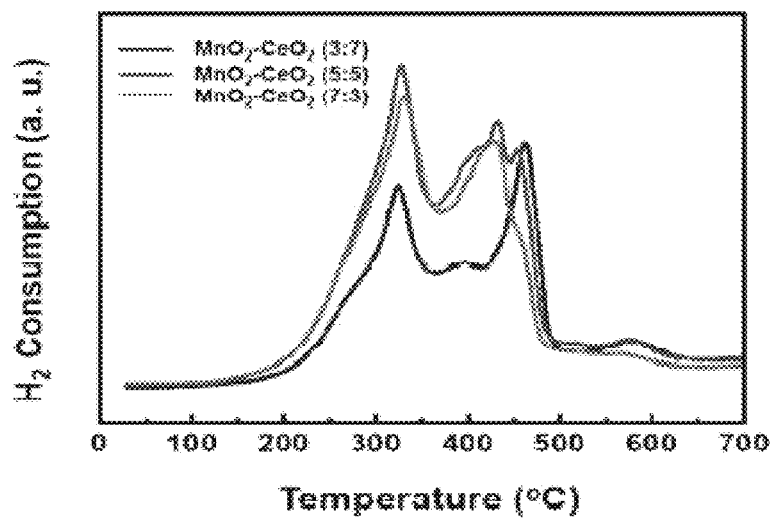

The $H_2$ TPR results are shown in FIG. 18b; the area of the peak centered at 327° C. indicated the amount of reducible species that is related to the transition of $Mn^4$ to $Mn^3$. The $MnO_2$—$CeO_2$ (7:3) nanocatalysts reveal the largest area of the peak corresponding to the reduction of $Mn^{4+}$ to $Mn^{3+}$, suggesting that the amount of reducible species increased as the content of the $CeO_2$ NPs increased from 3 to 5 wt %.

When the content of the $CeO_2$ NPs further increased to 7 wt %, the de-NOx efficiency decreased abruptly at low temperatures. The reduction peak of the $MnO_2$—$CeO_2$ (7:3) nanocatalysts at 324° C. decreased in intensity as the content of the $CeO_2$ NPs increased beyond the critical point (FIG. 18b). Although the samples with the higher $MnO_2$ contents were expected to show higher removal efficiencies at low temperatures, the $MnO_2$—$CeO_2$ (7:3) nanocatalyst, containing the highest amount of $MnO_2$, exhibited a lower efficiency than $MnO_2$—$CeO_2$ (5:5). In the present invention, the $MnO_2$—$CeO_2$ (5:5) sample showed a superior reduction capacity at 200° C. In the temperature range 350-500° C., the de-NOx efficiency increased gradually as the content of the $CeO_2$ NPs increased. It is also consistent with the results obtained from the $H_2$ TPR profiles.

In addition, the H2 TPR data showed that the catalysts displayed better reduction ability at higher temperatures (FIG. 18 b) when the content of the $CeO_2$ NPs was increased from 3 to 7 wt %. The area of the peak centered at 461° C. increased in the case of the $MnO_2$—$CeO_2$ (7:3) nanocatalyst.

(8) Surface Properties

To further demonstrate the relationship between the results of $H_2$ TPR and NOx removal, we examined the surface properties, including $NH_3$-TPD, the surface elemental composition, and specific area. The surface properties are closely related to the catalytic reactions between nanocatalysts and external gas molecules.

(A) $NH_3$-TPD

The result of $NH_3$-TPD provides information on the acid sites of the catalyst. In general, the absorption and activation of $NH_3$ on the acid site of a catalyst surface plays a key role in $NH_3$—SCR. It was reported that the $NH_3$ adsorbed on the Brønsted acid sites was more easily desorbed than that adsorbed on the Lewis acid sites. In other words, desorption in the low-temperature region indicates the presence of weak Brønsted acid sites, whereas desorption in the high-temperature region suggests the existence of strong Lewis acid sites.

Figure 20:
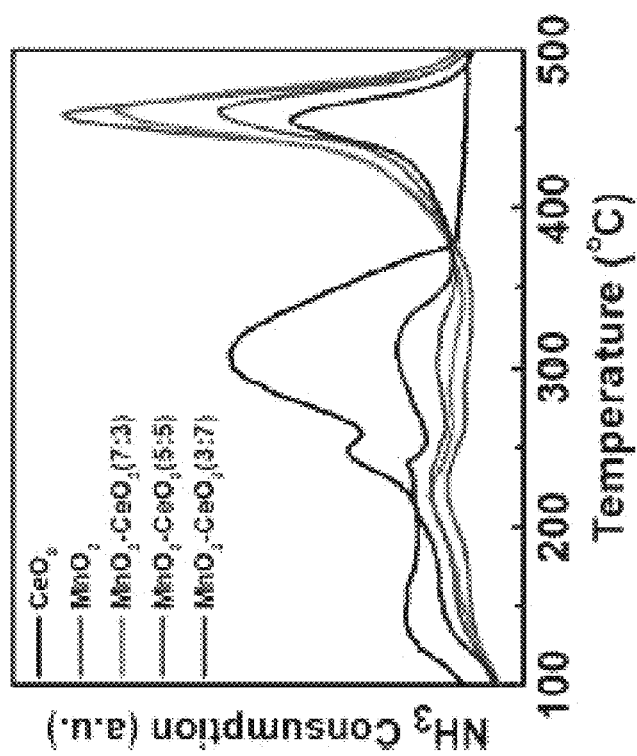
FIG. 20 is a graph showing $NH_3$-TPD profiles of $MnO_2$ and $CeO_2$ catalysts.

As shown in FIG. 20, the desorption peaks at 150-300° C. increased with the increase in the amount of $CeO_2$ loaded on the Mn—Ce catalyst. This indicates that the number of Brønsted acid sites increased with increasing content of $CeO_2$, which was found to be a critical factor for increasing the catalytic activity.

(B) Specific Surface Area

The specific surface area of the nanocatalysts was estimated using the BET (Micromeritics ASAP 2420) method.

Regarding the surface area, low-dimension $MnO_2$—$CeO_2$ nanocatalysts with hetero-nanostructures could provide several reaction sites for the NOx species, which may be beneficial for the $NH_3$—SCR of NOx. The specific surface areas of the $MnO_2$—$CeO_2$ nanocatalysts were determined by BET, and the results are listed in Table 4. The $MnO_2$—$CeO_2$ (5:5) sample exhibited the highest specific surface area and pore volume, resulting in efficient de-NOx reaction.

TABLE 4

| samples (wt % ratio) | $CeO_2$ | $MnO_2$ | $MnO_2$—$CeO_2$ (7:3) | $MnO_2$—$CeO_2$ (5:5) | $MnO_2$—$CeO_2$ (3:7) |
|---|---|---|---|---|---|
| SBET ($m^2/g$) | 0.91 | 1.51 | 3.46 | 3.59 | 2.26 |

(C) Surface Elemental Composition

The surface structure of the nanocatalysts was analyzed by XPS (ULVAC-PHI X-TOOL).

Figure 21A:
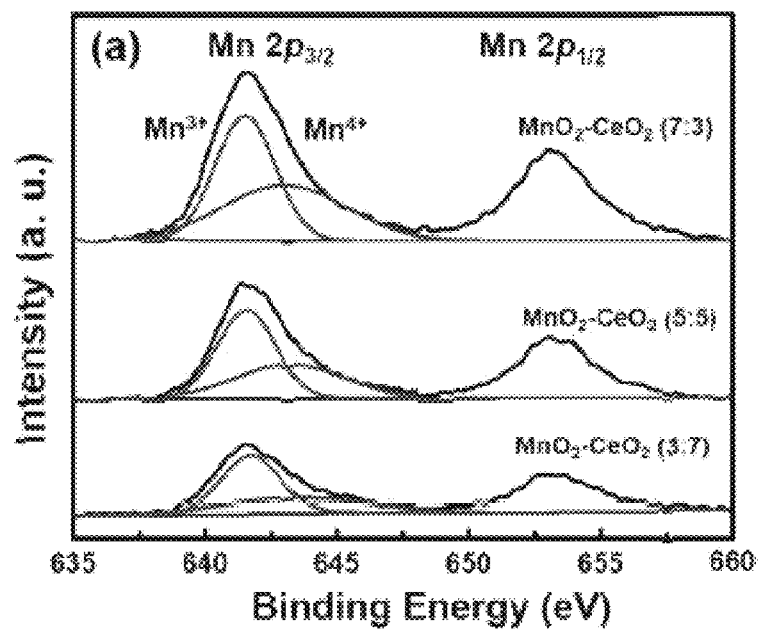
FIGS. 21(a) and 21(b) are graphs showing surface properties of $MnO_2$—$CeO_2$ nanocatalysts with different content ratios. Specifically.

The chemical state of the nanocatalysts in terms of the elements present was analyzed by XPS. FIG. 21a shows the XPS pattern of Mn 2p for the $MnO_2$—$CeO_2$ samples. The $MnO_2$—$CeO_2$ (5:5) sample appeared to have the highest $Mn^4/Mn^{3+}$ ratio. The binding energies of 643.3 and 641.1 eV could be attributed to the presence of $Mn^4$ and $Mn^{3+}$ species, respectively, in the $MnO_2$—$CeO_2$ (5:5) sample. $Mn^{4+}$ and $Mn^{3+}$ were regarded as the dominant valence states that affected the redox properties of the catalysts.

In particular, $Mn^{4+}$, the higher oxidation state of manganese, plays a crucial role in the fast SCR of NOx. Thus, the $MnO_2$—$CeO_2$ (5:5) nano-catalyst exhibits the highest reducing capability and NOx removal efficiency because of its high $Mn^{4+}$ content, which could enhance the oxidation of NO to NO2.

Figure 21B:
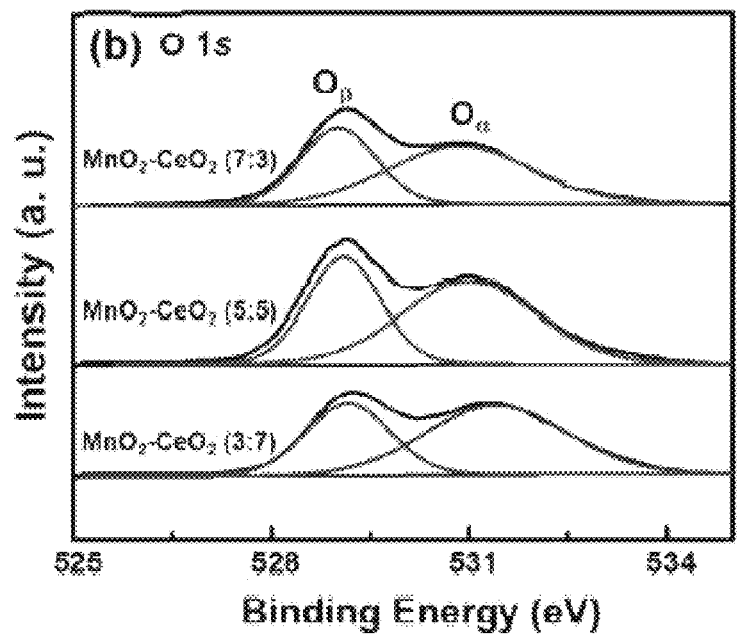

The corresponding XPS patterns of O 1s for the $MnO_2$—$CeO_2$ samples are shown in FIG. 21b; two surface oxygen species can be clearly observed based on the deconvoluted O 1s spectra. The binding energy of 529-530 eV is characteristic of the lattice oxygen ($O_2$) (hereafter denoted as OP), and the binding energy of 531-533 eV can be assigned to defect oxides or the surface oxygen ions with a low coordination (hereafter denoted as Oα). The abundance of Oα, which has a higher mobility than Oβ in the $MnO_2$—$CeO_2$ nanocatalysts, was important for the occurrence of the SCR reaction.

INDUSTRIAL APPLICABILITY

A nano-catalyst filter according to the present invention can be used to remove a harmful gas (nitrogen oxides (NOx), etc.).

The invention claimed is:

1. A method of manufacturing a nano-catalyst filter, comprising:
   providing a porous filter to which an electrode layer is attached;
   dipping said porous filter to which said electrode layer is attached into a plating bath filled with an electrolyte solution containing a nanowire catalyst precursor and nanoparticle catalyst precursor, and removing air in said porous filter by decompressing the plating bath; and
   performing electrodeposition;
   wherein the nanowire catalyst and the nanoparticle catalyst are formed inside the porous filter, and the nanoparticle catalyst is formed on the surface of the nanowire catalyst.

2. The method of claim 1, wherein the porous filter is formed of a material selected from the group consisting of ceramic, alumina, silica, mullite, zeolite, zirconia, titanium oxide, silicon carbide, and cordierite.

3. The method of claim 1, wherein the porous filter is formed as a disc type or a honeycomb type porous filter.

4. The method of claim 1, wherein the diameter of the nanowire catalyst is 5 to 50 nm, the length of the nanowire catalyst is 20 to 200 nm, and the average particle diameter of the nanoparticle catalyst is 1 to 10 nm.

5. The method of claim 1, wherein the nanowire catalyst and nanoparticle catalyst are each selected from the group consisting of a metal oxide, a transition metal, a noble metal, and a rare earth metal.

6. The method of claim 1, wherein the nanowire catalyst is at least one selected from the group consisting of manganese oxide ($MnO_2$) and vanadium oxide (VOx), and the nanoparticle catalyst is at least one selected from the group consisting of cerium oxide ($CeO_2$) and calcium oxide (CaO).

7. The method of claim 1, wherein the nanowire catalyst precursor and nanoparticle catalyst precursor are each selected from the group consisting of a metal oxide precursor, a transition metal precursor, a noble metal precursor, and a rare earth metal precursor.

8. The method of claim 1, wherein the concentration of the nanowire catalyst precursor is 0.01 to 100 mmol, and the concentration of nanoparticle catalyst precursor is 1 mmol to 1 mol.

9. The method of claim 1, wherein the electrolyte solution has a pH of 1 to 5.

10. The method of claim 1, wherein the decompression is performed at a pressure of 100 kPa to 100 mPa, and the internal pressure after the depressurization is 0.200 Pa or less.

11. The method of claim 1, wherein the decompression is performed for 10 minutes to 5 hours.

12. The method of claim 1, wherein the electrodeposition is performed at 0.1 to 300 mA/cm$^2$.

13. The method of claim 1, wherein the electrodeposition is performed for 10 minutes to 48 hours.

14. The method of claim 1, further comprising:
performing drying at 50 to 100° C. for 1 to 24 hours after the electrodeposition.

* * * * *